Jan. 27, 1953 K. L. BERNINGER 2,626,668
PROPELLER FEATHERING

Filed April 8, 1948 2 SHEETS—SHEET 1

INVENTOR.
Kenneth L. Berninger.
BY Spencer, Hardman & Felix
His ATTORNEYS

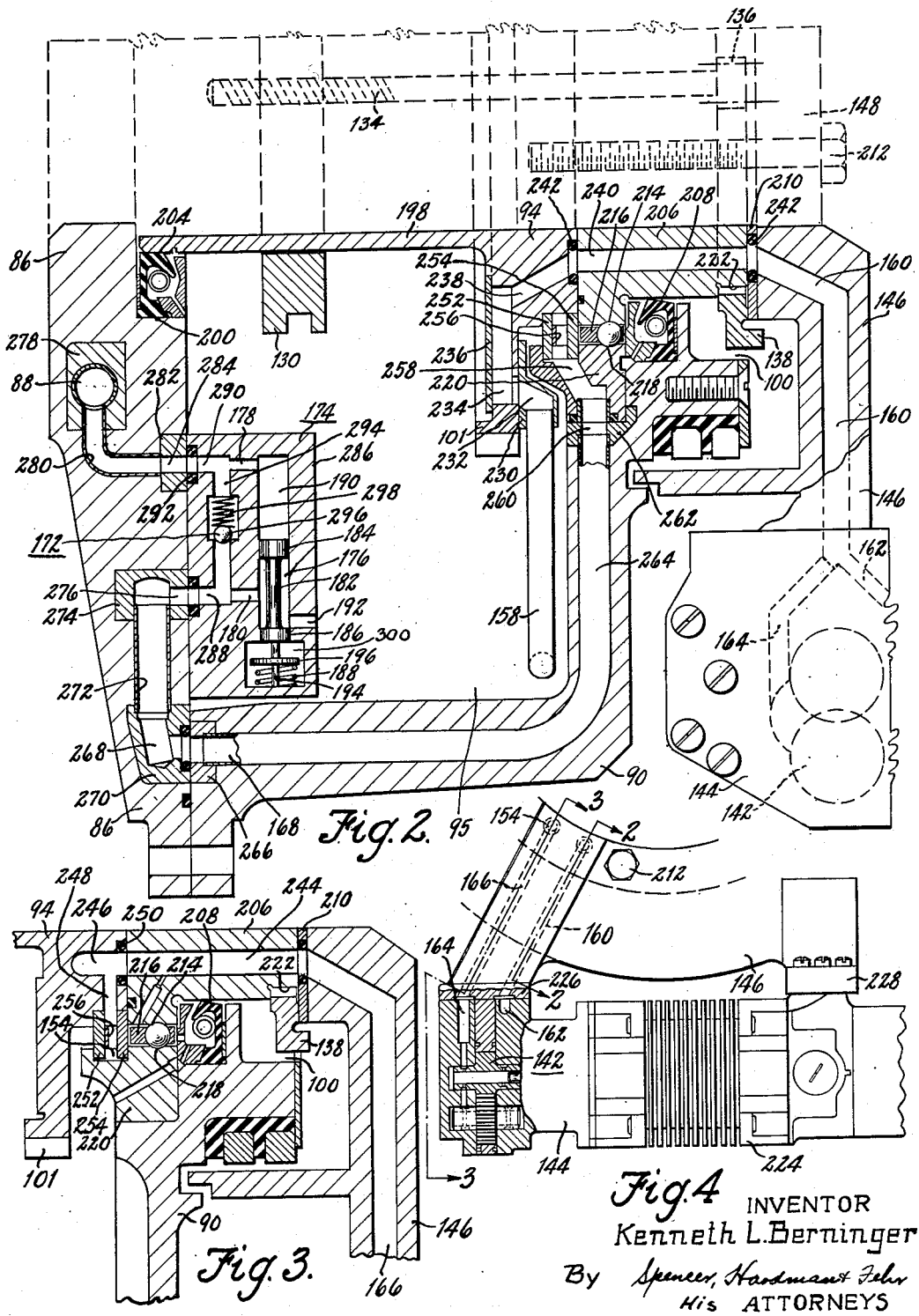

Patented Jan. 27, 1953

2,626,668

UNITED STATES PATENT OFFICE 2,626,668

PROPELLER FEATHERING

Kenneth L. Berninger, Dayton, Ohio, assignor to General Motors Corporation, Detroit, Mich., a corporation of Delaware Application April 8, 1948, Serial No. 19,722

10 Claims. (Cl. 170—160.21)

This invention relates to the art of feathering the blades of a propeller, particularly for aircraft.

The principal object of the invention is to provide a source of power and means, operable independent of the regulatory pitch shifting functions, for turning the blades in question into and out of the feather position at any selected moment.

Another object of the invention is to supplement a self-contained automatic pitch shiftable system of propeller control with selectively operable means for controlling the pitch shifting movement to a desired degree, principally for effecting feathering and unfeathering of the propeller blades.

Another object of the invention is to provide a supplemental or auxiliary power unit adapted to be cut into a system of power controlled or actuated mechanism for supplementing the system power means should the conditions requiring operation of the system be more exhausting than what the system power means can provide.

Further objects and advantages of the present invention will be apparent from the following description, reference being had to the accompanying drawings wherein a preferred embodiment of the present invention is clearly shown.

In the drawings:

Fig. 2 is a sectional view of a structural application illustrating certain features of the invention, the view being a section somewhat as indicated by the line and arrows 22 of Fig. 4.

Fig. 3 is a fragmentary view in section of the same structure showing other features of the invention, it being a view somewhat as indicated by the line and arrows 3—3 of Fig. 4.

Fig. 4 is an elevational view on a reduced scale, being a view somewhat as indicated by the line and arrows 4—4 of Fig. 1.

Figure 1:
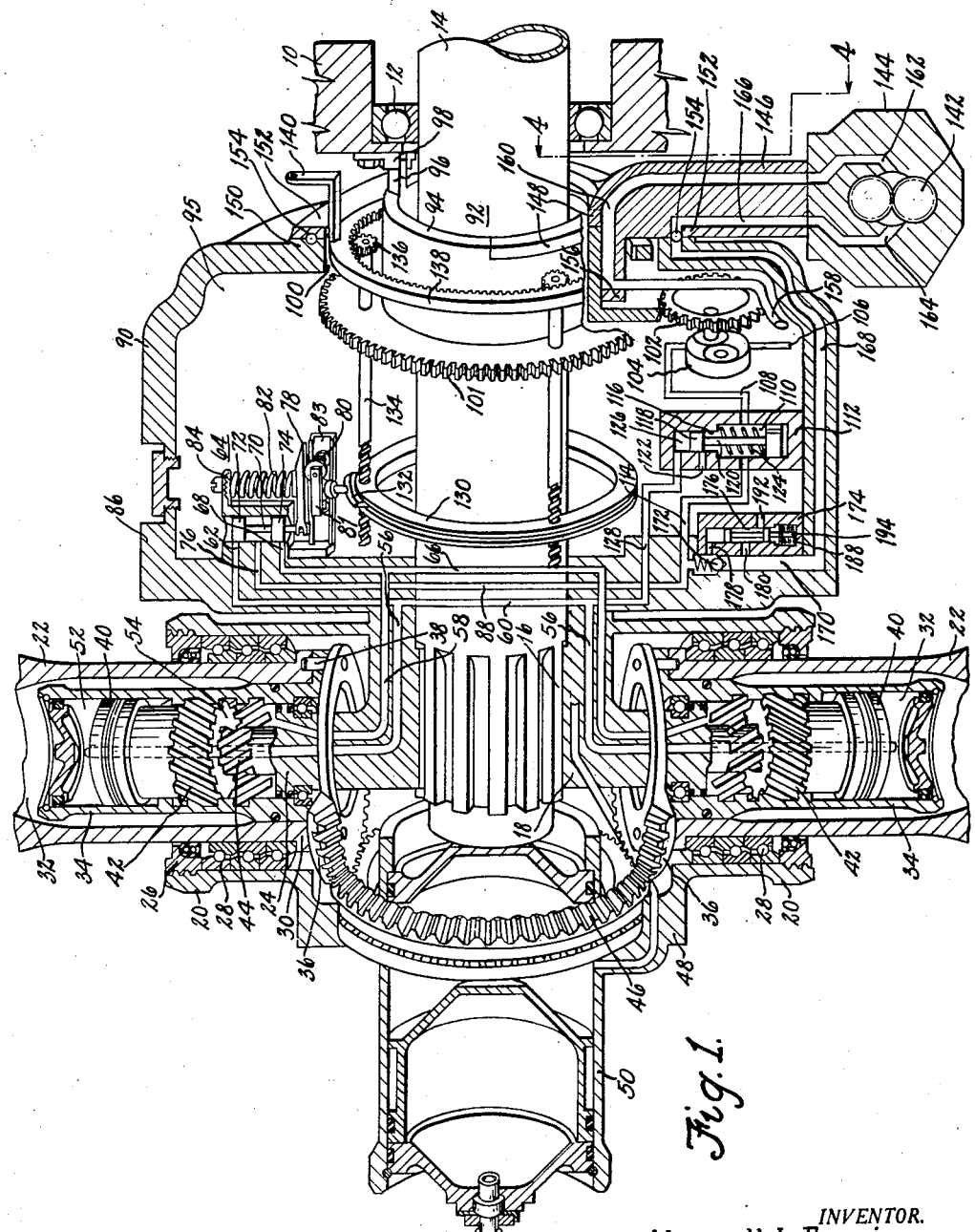
Fig. 1 is a schematic view in section of a self-contained and powered aircraft propeller showing the principal elements of a construction embodying the features of instant disclosure.

In aircraft propellers of the variable pitch type, it is desirable to have, in addition to the regular working range of blade angles where a propulsive force is developed, provisions for shifting the blades into an edge-on or feathering position so that the particular propeller will offer the least resistance to the relative wind. It is also desirable to be able to move the blades to that position and to return them to the working range at any time at the will of the pilot. In propeller constructions having self-powered means for the control of the blade pitch during propeller rotation, great power demands are imposed on the power developing systems available for inclusion in the self-controlled mechanism, leaving but a limited fraction of power for effecting the additional function of feathering. The power left after the self-control is effected may be inadequate, or it may of necessity be so low as to effect the feathering function at too slow a rate. The fact still remains, that there may be a need for fast feathering at any instant, and there is always need for a source of power to return the propeller blades to the range of self-control whether the craft be aloft or standing still on the ground with the driving engine not operating.

This invention provides an additional source of power supported on the craft structure supporting the rotatable self-controlled propeller that is manually controlled to add or substitute its power output to that of the self-powered mechanism, so that the same instrumentalities for regulating the blade pitch are properly powered for the feathering and unfeathering function. An appropriate switching device interposed in the juncture of connecting the two power systems to the pitch shifting instrumentalities, and responsive to both power systems, effects operative connection of either system without material loss. In the specific application shown in the drawings the self-controlled pitch-shiftable propeller is of the fluid pressure type having a hydraulic regulator providing a fluid reservoir enclosing a pump and control mechanism of valves, passages, and torque units or fluid servomotors for turning the blades. The pump is operable by reason of the propeller rotation to deliver fluid medium under pressure, which is distributed to the torque units as needed for pitch regulation. An additional pump, electrically driven at the wish of the pilot, has a fluid connection with the regulator through a check valve, and a flow and pressure control valve at the juncture operates to connect and disconnect the additional pump at the proper moment.

Referring to the drawings, first with respect to Fig. 1, 10 refers to a part of an aircraft providing a bearing 12 for journalling a propeller shaft 14 that is driven by an engine supported in the craft, but not shown. The shaft 14 has a driving connection at 16 with a propeller hub 18 providing sockets 20 for journalling blades 22 that are piloted about spindles 24 in their pitch shifting movement. Each blade 22 is retained in the respective socket 20 by a nut 26 receiving the thrust from a stack of bearings 28 engaged by a rib or flange 30 on the end of the blade, and the blade is hollowed in its stem at 32 to enclose a fluid cylinder 34 drivingly secured to the blade 22 and a blade segmental gear 36 by pins, dowels or the like 38. Working within the cylinder 34 there is a piston 40 that has a helical splined engagement at 42 with the inside of the cylinder 34 and a second helically splined engagement at 44 with the outside of the spindle 24, so that movement of the piston 40 lineally of the cylinder 34 and spindle 24 will effect rotary movement of the blade assembly within the socket 20. A master gear 46 is in rotatable engagement with all blade-gears 36 of the propeller so that the pitch shifting movement of the blades will be equalized, upon operation of the torque units or servomotors embodied in the splined piston and cylinder. The front end of the hub 18 is closed off by a plate 48 in any preferred manner, and the plate 48 may support an accumulator 50 available for storing pressure fluid to be used in negative pitch shift of the blades, or other functions, but which forms no part of this invention.

Hydraulic fluid under pressure is led to chambers 52 and 54 on opposite sides of the piston 40 in the cylinder 34 by passages 56 and 58 traversing the hub 18 and spindles 24, all of the passages 56 joining a fluid line 60 leading to a governor port 62 of a governor 64, and all of the passages 58 joining a line 66 leading to a governor port 68 of the same governor. The governor 64 provides a spool valve 70 having a pair of lands 72 and 74 operable in the equilibrium or governing position to stop fluid flow into either of the ports 62, 68 from a pressure support port 76. A lever 78 pivotally connected to the valve 70 rests at one end on a movable fulcrum 80 supported by a carriage 81 movable along guideways 83 as will presently be explained, while a spring 82 extending from a seat 84 to engage the lever 78 keeps the lever in position on the fulcrum and tends to move the valve 70 radially inward of the assembly, against the centrifugal force due to rotation tending to move the valve radially outward. The governor 64 is mounted on a regulator plate 86 carried by the hub 18, which plate may embody the passages 60, 66 as well as a passage 88 extending to the governor supply port 76 for delivering fluid under pressure to the governor valve for distribution to the torque units by the governor 64. Secured to the plate 86 is a cover 90 that cooperates with the plate 86 and an adapter assembly 92 to form an annular reservoir 95 enclosing the blade governing mechanism such as the governor 64 and the like.

The adapter assembly 92 comprises a sleeve 94 surrounding the shaft 14 where it is held against rotation by the propeller by means of a lug 96 engaging between clips 98 affixed to the support 10, and such that during operation of the propeller the regulator plate 86 and cover 90 rotate with respect to the adapter assembly 92. In other words, the adapter assembly projects into the reservoir 95 through an end opening 100 of the cover 90 to provide a relatively fixed tooth flange 101 standing outward from the sleeve 94 that is effective to drive a pump operating gear 102 driving a system pump 104 mounted in the reservoir. The pump 104 has its intake from the reservoir 95 by a pipe 106 and delivers into a passage 108 leading to a chamber 110 of a pressure control valve 112 and from which an extension 114 joins the supply passage 88 leading to the governor 64. The chamber 110 has a reduced bore 116 receiving a land 118 of a plunger 120, the land cooperating with an orifice 122 opening into the reservoir 95 from the bore 116, while the plunger 120 is assisted by a spring 124 to move outward under the effect of centrifugal force to close the orifice 122. Fluid pressure in the chamber 110 acting against the end of the land 118 tends to open the orifice, while a chamber 126 at the opposite side of the land 118 is connected by passage 128 with the line 60 leading to the governor port 62.

The structure thus far described is that usually found in a self-controlled propeller, and operates when rotated by an engine within the support 10, to rotate with respect to the adapter assembly and drive the pump 104 to supply pressure fluid to the system conduit 88 for distribution by the governor valve 64 after the manner described and claimed in the patent to Blanchard et al. 2,307,102.

The pressure control valve 112 so regulates the potential of the outlet from pump 104 that there will be available in the system conduit 88 sufficient pressure to accomplish any of the governing functions called for by the control apparatus in the regulator. The controlled pressure applied to the port 76 of the governor is applied to the increase pitch port 62 if the governor valve 70 moves outward on an increase speed, and is applied to the decrease pitch port 68 if the governor valve 70 moves inward on a decrease of speed. The pressure applied to either control port 62, 68 is led by the respective passages 60, 56, and 66, 58 to the chambers 52, 54 respectively in the torque units. In the embodiment here shown, the torque unit chamber 52 requires more power applied to it for movement of the blade in an increasing pitch direction than is required for application to the chamber 54 for decrease pitch movement, for which reason the fluid passage 128 is made between the line 60 and the chamber 126 of the pressure control valve 112. Under those conditions the system pressure applied to the increase to the increase pitch port 62 of the governor is also applied to the chamber 110 of the pressure control valve for assistance of the spring 124 and plunger 120 in raising the blowoff point of the valve that means that the orifice 122 will be at least somewhat more closed during pressure application to the increase pitch chamber of the torque unit.

The speed level at which the control mechanism will function to establish governed speed is determined by the position of the fulcrum 80 along the length of the lever 78. Means are provided for selecting that speed level, and include a grooved control ring 130 carried by the adapter assembly 92 to surround and be moved axially of the shaft 14, with a shoe 132 secured to the carriage 81 following in the groove of the ring 130. Screw shafts 134 threaded through the ring 130 and journalled in the flange 101 end in pinions 136 engaging an internal ring gear 138 journalled in the cover 90 or having other bearing on the adapter assembly, which ring has a lever 140 adapted to connect with linkage to the pilot's compartment. Thus, by oscillating the ring gear 138, the screw shafts 134 are threaded into or out of the control ring 130 to move it along the shaft 14. That movement of the ring 130 shifts the carriage along the guides 83 and the fulcrum 80 along the length of the lever 78 to alter the moment arms through which centrifugal force and spring force work upon the valve plunger 70. If the fulcrum is shifted to about the position shown in Fig. 1, the mechanism will be set for governed speed at a fairly high speed level. If an increase in governed speed is desired the fulcrum would be moved a little to the right of the position shown, and if a negative pitch position is desired, then the fulcrum would be shifted to the very end to the right of the lever. On the other hand, if a reduced speed of operation is desired then the fulcrum would be shifted toward the left of Fig. 1, and to a point between the point of spring pressure on the lever and the pivoted end of the lever with the valve 70, where the feathering pitch is desired. Shifting of the fulcrum to the feathering position so alters the forces acting upon the valve 70 that it no longer effects a governing function, but adjusts the force of the spring 82 bearing upon the lever 78 that it is now in assisting relation to centrifugal force acting upon the valve 70 that the valve will be cast radially outward of the regulator to open the increase pitch port 62 to the fullest extent and connect it with the pressure supply port 76. Under those conditions there is a complete fluid circuit from the pump 104 through the elements 108, 110, 114, 88, 76, 62, 60, and 56 to the torque unit chamber 52. Fluid pressure exercised in that chamber pushes the piston 40 inward to turn the blades in a pitch increasing direction, with a consequent drain from chamber 54 through 58, 66 and 68 to the reservoir 95. Flow through that circuit continues so long as the pump 104 rotates with sufficient force to deliver fluid under pressure into the system, but the increasing pitch of the blades rapidly reduces the speed of the propeller, and the pressure control valve 112 cannot control for more pressure than is put into it. As a result the system pump is incapable of effecting the full feathered position of the blades.

An auxiliary source of fluid pressure under the constant control of the pilot, is provided so that the propeller blades may be feathered and unfeathered at any time by substituting the auxiliary source for the system source. In the schematic view of Fig. 1 the pump is indicated at 142 as contained in a housing 144 secured to a bracket 146 which has lugs 148 attached to the adapter sleeve 94, so as to depend therefrom in abutting relation with the rotatable cover 90 of the reservoir 95. The point of abutment between the bracket 146 and the face 150 of the cover is effected by a flange 152 of the bracket, both of the face 150 and the flange 152 being cooperatively grooved at 154 to provide a fluid transfer or collector ring along the parting line of the relatively rotatable parts 150 and 152. An axial extension 156 of the bracket 146 projects into the reservoir 95 through the opening 100 of the cover to support an intake pipe 158 ending at the inner periphery of the reservoir and communicating with a passage 160 of the bracket 146 leading to the intake channel 162 for the pump 142 which empties into a delivery channel 164 opening into a passage 166 communicating with the transfer passage 154. The cover 90 provides a channel, pipe or passage 168 extending from the transfer passage 154 to a passage 170 in the plate 86 that also provides a check valve 172 opening into the system supply passage 88, 114. A flow and pressure control valve 174 is so mounted on the plate 86 that it has a bore 176 opening by ports 178, 180 to opposite sides of the check valve 172, a plunger 182 providing spaced lands 184, 186 traversing the bore 176, the plunger 182 being pressed radially inwardly by a spring 188 against the effect of centrifugal force tending to move the plunger outward. (See Fig. 2.) The land 184 always separates the ports 178 and 180 and provides a chamber 190 at the end of the bore 176 that opens to the outlet side of the check valve and hence is always exposed to the system pressure in 88, 114. An exhaust port 192 from the bore 176 empties into the reservoir 95 and may be connected with or isolated from the port 180 in response to forces acting upon the plunger 182, those forces including the pressure in chamber 190 and centrifugal force tending to move the plunger outward, and the force of the spring 188 tending to move the plunger 182 inward. A spindle extension 194 on the plunger 182 limits the outward movement of the flow valve, and a stop flange 196 limits the inward movement. So long as the pressure in the system passage 88 is sufficient to effect the control desired, the plunger 176 is shifted outwardly as shown to connect passage 170 through 180, 192 to the reservoir 95, but if the combined effect of pressure in the passage 88 and centrifugal force on the valve plunger 182 is insufficient to move or hold the plunger in the outward position the fluid connection between 180 and 192 will be interrupted, so that any pressure developed in 170 will now be applied against the check valve 172 for admission into the system passage 88, 114. The pump 142 is electrically driven, and is under the control of the pilot who can close the proper switch for setting the pump into operation. During normal propeller operation the pump driving gear 102 rolls around the toothed flange 101 and develops fluid pressure which is delivered into passage 114 and controlled by the pressure control valve 112. Whatever pressure is existent in the passage 114 and the outlet side of the check valve 172 is also present in the port 178 and chamber 190. The pressure in 190 acts on the end of the plunger 176 particularly the area of land 184 to press the plunger radially outward in assistance of centrifugal force due to propeller rotation and in opposition to the spring 188. In its outward position where the stop spindle 194 is effective the valve establishes communication between the ports 180 and 192 so that operation of the auxiliary pump 142 will discharge back into the reservoir 95. Thus the operation of the system pump 104 is not interrupted, if the fluid pressure of the rotating propeller control is sufficient to supply the needs called for by the self-controlling means.

Shifting of the fulcrum 80 to effect feathering of the blades places the fulcrum to the left of the point of spring pressure on the governor lever 78 and effects a clockwise teetering of the lever over the fulcrum in its new position which opens wide the increase pitch port 62 to the pressure supply port 76, whereby the full output of the system pump 104 is delivered to the pitch increasing chambers 52 of the torque units. For a brief period during this change the speed of propeller rotation and delivery of the pump 104 may be sufficient to hold the valve plunger 182 in the outward position so that the feathering function will be started. However, the increasing pitch of the blades increases the load upon the propeller and its driving means with a consequent reduction in speed and lessened output of the system pump 104. A condition is soon reached where the combined effects of centrifugal force and pressure acting upon the valve is insufficient to maintain the valve in the outward position and the spring 188 then dominates and moves the valve plunger inward of the bore 176 to the point permitted by the stop 196. In that position port 192 will be cut off from port 180 so that operation of the auxiliary pump 142 will develop sufficient pressure in 170 to flow by the check valve 172 and into the system supply passage 88. The entire output of the feathering pump is thereby delivered to the governor valve 64 for application to the increase pitch port 62 and the chamber 52 of the torque unit. As a result the blades will be rapidly shifted to the feathering position. Should the feathering pump 142 be permitted to continue operation, the high pressure thereby developed will be relieved to the reservoir so that no injury is done to the control mechanism and so that no loss of fluid is encountered.

The high pressure developed under those conditions will obtain in the passage 88, 114 and will penetrate to the chamber 110 of the pressure control valve 112, and to the chamber 190 of the pump control valve 174. That pressure in the chamber 110 of the pressure control valve will be balanced in its effect upon the end of the land 118 inasmuch as the chamber 126 is exposed to the same pressure through passages 128 and 60 to increase pitch port 62, but the pressure in the chamber 190 of the pump control valve 174 is opposed only by the force of the spring 188 since the propeller is not now rotating. In consequence of the latter the valve 182 is moved outward to connect ports 180 and 192 which now return the delivery of pump 142 to the reservoir.

At any time desired the blades of the propeller may be unfeathered or returned to the self-controlling range by moving the fulcrum to a position at right of the line of force exerted by the spring 82, or to a position somewhat near that shown in Fig. 1 of the drawings. When unfeathering is called for the propeller will not be rotating, and the craft may be either aloft or it may be standing on the ground. In either instance, moving the governor fulcrum 80 to the right will effect a counterclockwise teetering of the lever 78 over the fulcrum which causes the valve plunger to moved radially inward for wide open connection of the pitch decrease port 68 with the pressure supply port 76. There being no pressure developed in the system supply passage 88, 114 then the pump control valve plunger 182 will be at the radially inward position due to the force of the spring 188, thus cutting off the return of pump 142 to the reservoir 95. If now the pump 142 is operated its output will flow through the check valve 172 into the system supply line 88 and thence to the port 76 of the governor valve and by port 68 to the chambers 54 of the torque units. Application of fluid pressure in decrease pitch chambers 54 force the pistons 40 outward turning the blades in a decreasing pitch direction, until they assume the working range of adjustment. If the craft is standing on the ground when the working pitch is reached the blades may be shifted to the extreme low pitch or negative pitch position unless the operation of the feathering pump is sooner interrupted. Should the blades be moved against a low pitch stop where the pressure in the system would build up by reason of the continued output of the feathering pump, the high pressure developed by the feathering pump will be relieved to the reservoir 95 in a manner similar to that described above. The pressure control valve 112 is now also available to effect a pressure reduction in the line 88 and return the pump output to the reservoir, because now the chamber 126 of the pressure control valve is exposed to the drain of pressure fluid from the torque unit chambers 52 through the passages 56, 60 and governor port 62. Thus should the pump control valve 174 be slow in reducing the pressure and returning the flow to the reservoir the pressure in chamber 110 on the end face of land 118 will force the valve inward to open the orifice 122. If the craft is aloft and moving through the air when the working pitch is reached, the propeller will have been set into rotation by the relative wind which effects windmilling. Eventually a point will be reached where the engine will become self-operative and the propeller will rotate with sufficient speed and force that the system pump will deliver fluid under pressure to the system pressure line 88, 114, and centrifugal force acting on the pump control valve augmented by the system pressure developed will effect outward movement of the valve member 182 to shunt the delivery of the feathering pump to the reservoir 95. Then the feathering pump motor may be stopped. The propeller mechanism will thenceforth be self-controlled until a subsequent feathering function is introduced.

For details of construction in embodying the feathering control mechanism in a physical embodiment of an aircraft propeller, reference is now made to Figs. 2 to 4 inclusive of the drawings, where there is shown an enlarged section of the lower right-hand portion of Fig. 1, detailing the feathering pump connection with the self-controlling regulator, and the fluid circuit elements whereby the feathering pump is connected with the system circuit. So far as possible the same reference characters are used though the configuration of the elements may vary. The adapter assembly 92 here, in addition to the sleeve 94 providing the toothed flange 101 has an extension 198 extending axially of the reservoir 95 to nest in an inner annular recess 200 of the regulator plate 86 where it is engaged by an annular fluid seal ring 204. Abutting the end of the sleeve 94 there is a spacing ring 206 engaged by a fluid seal ring 208 secured at the inner periphery of the cover member 90, a shim 210 being interposed between the end of the spacer 206 and the elements 148 of the pump supporting bracket 146, and all of which are secured together by screw devices 212 threaded into the thicker section of sleeve 94. The spacer ring 206 has a bearing race 214 traversed by antifriction elements 216 rolling in an outer race 218 provided in a bearing ring 220 secured in the edge of the cover, so that the regulator and its cover may be made to rotate concentrically with respect to the adapter assembly. The spacer ring 206 is circumferentially channeled at 222 to receive in shiftable relation the actuating ring 138 that has toothed engagement with the pinions 136 of the screw shafts 134 shown in dashed lines in Fig. 2 as threading into the control ring 130. The pump 142, a section of which is shown in Fig. 4, is attached to an electric motor 224, in turn secured to the bracket 146 by means of appropriate pads 226 and 228, such that the passages 162, 164 of the pump match up with the passages 160, 166 of the bracket.

The intake passage connection of the pump 142 to the reservoir is shown in Fig. 2 where the scoop or pipe 158 is secured to a clip 230 attached to the toothed flange or pump driving gear 101 so that the pipe 158 opens into a passage 232 of the clip and thence into an opening 234 of the flange which opening is covered by a plate 236 and has a passage 238 communicating with a drillway 240 in the spacer ring 206. The drillway 240 is in turn aligned with the end of passage 160 in the bracket 146. There are seals 242 disposed between abutting parts where needed to stop fluid leakage. The outlet side of the pump 142 is shown in Figs. 2 and 3, where the passage 166 opens into a second drillway 244 through the spacer ring 206 and there opens into a recess 246 in the face of the sleeve 94 to extend radially outward at 248 into the running joint indicated in Fig. 1 at 154, seals 250 being used where desired. To perfect fluid transfer at this running joint without undue leakage, the overhanging concentric portions of the sleeve 94 and bearing ring 220 are fashioned to receive a pair of seal rings 252 and 254 of sheet material that are held in axial spaced relation by a wave spring 256. This is accomplished by an exterior peripherial groove on the sleeve 94 radially aligning with an internal annular groove in the bearing member 220, the lateral walls of the two grooves being radially aligned so that the spring 256 presses each ring against a pair of concentric shoulders, one each of which is provided by each of the rotating and stationary structures. As shown by Fig. 3, the space between the seal rings 252, 254 is always open to the passages 248, 246, 244 and 166, and as shown by Fig. 2 the space between the seal rings 252, 254 is always open to a passage 258 in the bearing ring 220 to communicate with a passage 260 in a mounting pad 262 of the cover 90 to which is joined a tube 264 embedded in the cover to provide the passage 168 described in connection with Fig. 1. The tube 264 has its other end joined to a pad 266 located at the face of the cover 90 where it abuts the plate 86, and there aligns with an opening 268 in a pad 270 embedded in the plate 86 and communicating with a pipe 272 leading to a pad 274 having an orifice 276. Another pad 278 embedded in the plate 86 has an opening into the system supply passage 88, and supports a pipe 280 extending to a pad 282 that ends in an orifice 284.

The pump control valve 174 of Fig. 1 here comprises a body 286 mounted upon the face of the plate 86 within the reservoir 95 and has orifices 288 and 290 mating respectively with the orifices 276 and 284, there being suitably interposed seals 292 to prevent fluid leakage at the joints. Communicating between the orifices 288 and 290 there is a passage 294 within which is disposed the ball 296 and spring 298 of the check valve 172. The passage 178 extends from one end of passage 294 to the pressure chamber 190, while the port 180 connects the other end of passage 294 to the pressure chamber 190, and 298 connects said other end of the passage 294 to the bore 276. The stop means for the valve are provided by enclosing the spindle 194 and disc 196 within a chamber 300 so designed that the opposite ends of the chamber are engaged by one or the other of the stop means in their limiting positions.

It can be seen that during rotation of the propeller, if the pump driving motor 224 is energized, that fluid within the reservoir 95 will be drawn through the pipe 158 that acts as a scoop, and delivered to the passages 232, 234, 238, 240 and 160 in flowing to the pump intake 162. That fluid will be forced out under pressure through 166, 244, 246, 248 to the rotating gland or fluid transfer ring 154. From the transfer ring the fluid under pressure will flow through 258, 260, 264, 168, 268, 272, and 276 to the passage 294. From the passage 294, as illustrated in Fig. 2, the fluid will flow through 180, 176 and 192 to the reservoir 95. However, if the valve 174 is in the pump connecting position, which is the radially inward position, the fluid will then flow past the ball 296 and the spring 298 into 290, and thence through 284, 280 to 88, the system supply line. Though there is relative movement between the bearing ring 220 and the sleeve 94 at the point where the seal rings 252, 254 are disposed there will be immaterial leakage if any, since the rings are wear resistant and are fitted against plane surfaces formed by the opposing grooves containing them.

While the embodiment of the present invention as herein disclosed, constitutes a preferred form, it is to be understood that other forms might be adopted, all coming within the scope of the claims which follow.

What is claimed is as follows:

1. In a variable pitch propeller mechanism, a rotatable hub, blades mounted in the hub for rotation about their longitudinal axes to vary the pitch thereof, a hollow member connected to and rotatable with said hub, a fixed member disposed within said hollow member and about which said hollow member rotates, means operative upon relative rotation between said two members for developing a system source of fluid pressure, pitch changing means including fluid pressure actuated means and a fluid pressure circuit including said system source operatively connected with said blades and carried by the rotatable hub for rotating the blades about their longitudinal axes, valve means in said circuit between said system source and said pitch changing means for selectively controlling the application of fluid pressure to said pitch changing means to effect governed pitch and feathering pitch adjustment, an additional source of fluid pressure connectible with said system source to insure completion of pitch adjustment selected by the valve means, manually controlled means for selectively operating said additional source, and a flow control unit carried by said hub and having means exposed to the pressure of said system source for controlling the connection of the additional source and the system source.

2. The combination set forth in claim 1 wherein the means operative upon relative rotation between said two members for developing said system source of fluid pressure and the pitch changing means include a pump driven upon relative rotation between said hollow and fixed members, and a variable pressure control valve in said circuit and including means having opposed areas exposed to pump output and pressure existent in said pitch shifting means in connection with the outlet of said pump for maintaining pump output at a sufficient pressure potential to effect governed pitch adjustment, and wherein the means associated with the flow control unit exposed to the pressure of said system source includes a spring urged element for connecting the additional source to the system source upon a reduction of pressure potential below that required to effect a pitch shift selected outside of the governor pitch setting.

3. The combination set forth in claim 1, wherein the additional source of fluid pressure includes a pump outside of the propeller with fluid intake and outlet from and to the hub, said flow control unit including a pump control valve carried by the hub for connecting and disconnecting the additional source with and from the system source, said pump control valve carrying a piston communicating with and subject to the pressure of said system source and subject to centrifugal force for returning the output of the additional source to the hub when the system source is sufficient to supply the pressure needs for pitch adjustment, and a spring engaging and acting on said piston for controlling the connection of the additional source to the system source when the system source is insufficient to effect the pitch change called for by the manually controlled means.

4. The combination set forth in claim 1, wherein the additional source of fluid pressure includes a pump outside of the propeller with fluid intake and outlet from and to the hub, a running joint between the additional pump and the hub for transfer of fluid from the fixed additional source to the rotating hub, said running joint comprising a pair of concentric cylindrical surfaces radially spaced and relatively rotatable, said cylindrical surfaces having rectangular channels circumscribing the surfaces and disposed in the same plane, sheet-like seal rings spanning the radial spacing of the channels and adapted to engage a side-wall of both channels, and a wave spring-ring disposed between the seal rings to urge each ring against the shoulders of the channels.

5. In a variable pitch propeller mechanism, a hydraulic regulator rotatable with the propeller and providing a pitch control mechanism and a source of fluid under pressure incident to propeller operation, a reservoir enclosed by the regulator and charged with a fluid medium, a pump and motor supported outside of the regulator, passage means forming an intake from said reservoir for said pump, a discharge line from the pump to said first mentioned source of fluid pressure, and a control valve inserted at the juncture of said pump discharge line and said source of fluid pressure for bypassing the discharge of pump and motor to the reservoir when the first mentioned source of fluid pressure meets the requirements of the pitch control mechanism.

6. The combination set forth in claim 5 wherein the support for the pump and motor comprise a relatively fixed adapter sleeve extending into the regulator and about which the regulator and pitch control mechanism rotate, bearing means between the adapter sleeve and regulator, and fluid transfer means spanning the said bearing for transmitting the output of said outside pump and motor to the said pressure source while the regulator and adapter sleeve are relatively rotating.

7. The combination set forth in claim 5 wherein the support for the pump and motor comprise a relatively fixed adapter sleeve extending into the regulator and about which the regulator and pitch control mechanism rotate, bearing means between the adapter sleeve and regulator, and fluid transfer means spanning the said bearing for transmitting the output of said outside pump and motor to the said pressure source while the regulator and adapter sleeve are relatively rotating, said fluid transfer means including relatively rotatable cylindrical portions provided by the adapter sleeve and regulator each of which has an annular channel radially aligned with the channel of the other, a pair of sheet-like rings disposed in the channels so as to span the cylindrical parting line between the cylindrical portions, and spring means disposed between the rings to separate them axially and maintain engagement respectively with the edges of both channels.

8. In a hydraulic regulator having a rotatable part and a fixed part cooperating to provide a fluid reservoir enclosing fluid pressure developing means and distributing means connected by a pressure supply passage, the combination comprising means including said rotatable part and fixed part providing a pair of cylindrical, radially spaced, concentric portions, each portion having a peripheral groove of rectangular section coextensive with and opening toward the other groove, fluid seal means engaging within both grooves for transmitting fluid flow from one part to the other part, passage means provided by the rotatable part connecting its peripheral groove portion with the said pressure supply passage, a pump carried by the fixed part outside of the regulator, and passage means connecting the pump output with the peripheral groove of the fixed part.

9. The combination set forth in claim 8 wherein the fluid seal means engaging both grooves includes two continuous sheet metal rings each of which spans the parting line between the cylindrical portions and extends to the bottom of both peripheral grooves, and spring means disposed between the sheet metal rings for pressing them against the side walls of the grooves.

10. The combination set forth in claim 8 wherein the passage means provided by the rotatable part includes a valve unit carried by the rotatable part and having a check valve opening from the said passage to the pressure supply passage, and a pressure controlled valve and port opening from said passage to the reservoir when the potential of pressure in the pressure supply passage is sufficient to satisfy the demands of the said distributing means.

KENNETH L. BERNINGER.

REFERENCES CITED

The following references are of record in the file of this patent:

UNITED STATES PATENTS

| Number | Name | Date |
|---|---|---|
| 2,257,126 | Rindfleisch | Sept. 30, 1941 |
| 2,320,195 | Rindfleisch | May 25, 1943 |
| 2,352,336 | Martin et al. | June 27, 1944 |
| 2,363,670 | Hoover | Nov. 28, 1944 |
| 2,391,699 | Haines et al. | Dec. 25, 1945 |
| 2,413,439 | Drake | Dec. 31, 1946 |
| 2,465,090 | Haines et al. | Mar. 22, 1949 |

FOREIGN PATENTS

| Number | Country | Date |
|---|---|---|
| 499,634 | Great Britain | Jan. 26, 1939 |